United States Patent [19]

Arter et al.

[11] 4,011,587
[45] Mar. 8, 1977

[54] ROTARY HEAD MAGNETIC RECORDER FOR USE WITH A SPECIFIC RECORD MEMBER

[75] Inventors: Nelson K. Arter; Thomas F. Eichhorn, both of Boulder County; Clement H. Kalthoff, Boulder, all of Colo.

[73] Assignee: International Business Machines Corporation, Armonk, N.Y.

[22] Filed: Sept. 8, 1975

[21] Appl. No.: 611,476

Related U.S. Application Data

[62] Division of Ser. No. 451,270, March 14, 1974, Pat. No. 3,932,894.

[52] U.S. Cl. ................................. 360/62; 360/64; 360/70; 360/72; 360/77
[51] Int. Cl.² .................. G11B 5/09; G11B 15/02; G11B 27/32
[58] Field of Search ................. 360/61, 62, 64, 70, 360/72, 77, 84, 108, 49

[56] References Cited

UNITED STATES PATENTS

| | | | |
|---|---|---|---|
| 3,666,897 | 5/1972 | Harr | 360/84 |
| 3,789,138 | 1/1974 | Terada | 360/72 |
| 3,838,453 | 9/1974 | Buslik et al. | 360/70 |
| 3,845,500 | 10/1974 | Hart | 360/77 |

*Primary Examiner*—Raymond F. Cardillo, Jr.
*Attorney, Agent, or Firm*—Herbert F. Somermeyer

[57] ABSTRACT

An elongated magnetic tape has a pair of longitudinally extending servo track areas, one of which is closer to the longitudinal center of the tape than the other. The lateral space intermediate the servo areas receives data signals, while the space between said one servo area and one edge contains identification and address signals. The tape is particularly adapted for use with rotating head recorders having two gaps on the rotor, with an intergap distance slightly greater than the lateral extent of the servo areas. A recording or write gap precedes an immediately trailing reading or recovery gap. When the rotor gaps pass the one edge in the one servo area, the write gap senses the servo track; while the read gap senses the identification signals. The arrangement is such that prior to the time the write gap reaches the data recording area, the read gap has sensed the identification signals. In a similar manner, when the gaps are leaving the data signal area, the write gap is sensing the other servo area; while the read gap is still sensing data. The longitudinal extent of the servo areas indicates, respectively, beginning of tape (BOT) and end of tape (EOT). A leader portion includes a magnetic coating for facilitating calibrating magnetic recording apparatus to each particular article.

1 Claim, 4 Drawing Figures

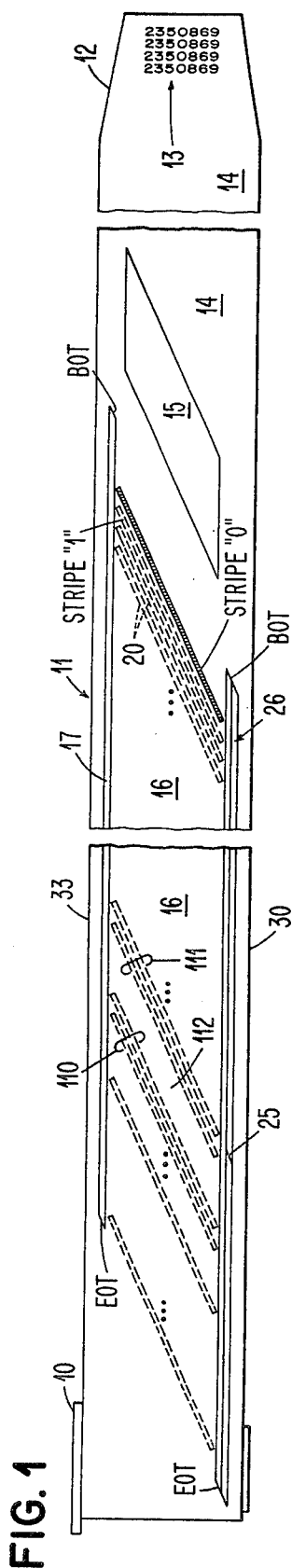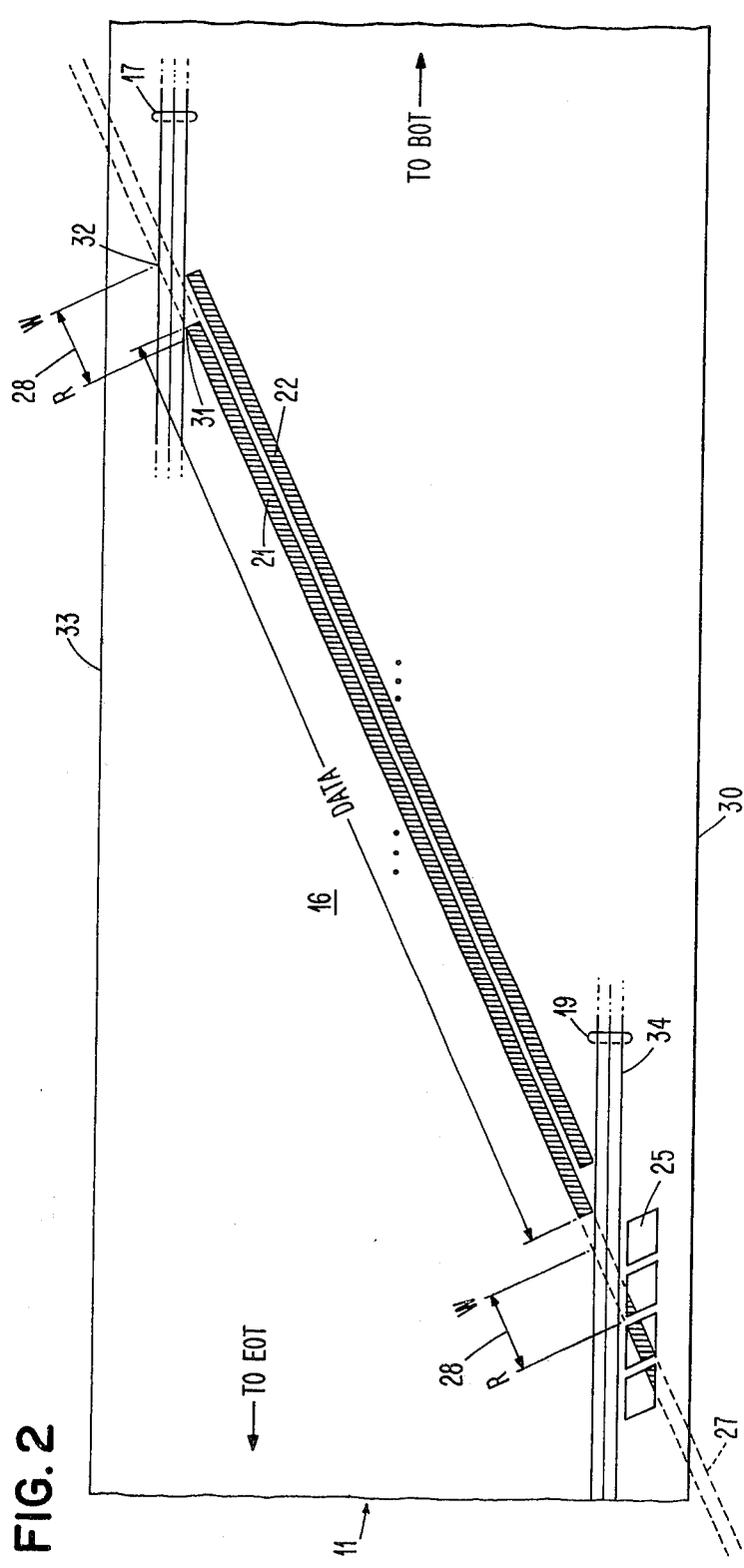
FIG. 1
FIG. 2

ROTARY HEAD MAGNETIC RECORDER FOR USE WITH A SPECIFIC RECORD MEMBER

This is a division, of application Ser. No. 451,270 filed 3/14/74 now U.S. Pat. No. 3,932,894.

BACKGROUND OF THE INVENTION

The present invention relates to an improved magnetic medium particularly adapted for use with rotating head magnetic recorders, also referred to as "transverse" magnetic recorders.

Rotating head recorders have been used for the last several years for recording video or television signals. Such signals are analog in character which permits repeated signal usage to compensate for defective recording, while not materially detracting from the quality of the television picture presented on a television set or CRT screen.

Such video recorders employ carrier recording techniques with the carrier at the upper portion of the frequency band of the signals being recorded. Such video recorders have been employed for digital data recording by modulating digital data signals on the normal video carrier. In contradistinction, most other digital data recorders employ baseband recording rather than heterodyne the information-bearing signals on a carrier.

Another aspect of digital data signal recording is that any error conditions cannot be obviated in the same manner as video recording signals can submerge or enable errors to be ignored. In data recording, all signals read back from a record medium must be correct. Further, tape motions employed with digital signal recorders and that of video recorders are quite different. Requirements of a digital signal record medium usually require that the magnetic recorder should be able to step the medium to any selected position along its longitudinal length and then precisely indicate to controlling apparatus that the medium is at the desired location. In one form of digital signal data recorders employing rotating heads, during the recording, the magnetic medium is completely stopped; i.e., the apparatus operates on a step-by-step or incremental mode. That is, one record stripe is recorded while the tape is stopped. The tape moves to the next stripe with additional data being recorded, etc. Accordingly, any article to be employed with digital data recorders should be capable of being operated efficiently in a step-by-step or incremental mode, as well as in a continuous motion or slewing mode.

The history of digital data recording on magnetic tape media indicates that as the technology advances there is a great desire on the part of users that there be backward compatibility. The term "backward compatibility" means that all newly designed digital data recorders have a capability of reading all previous digital data formats. For example, in the ½ inch tape area, digital data recorders employing 1,600 cpi phase-encoded recording also usually have the capability of reading the prior 800, 556, and 200 cpi NRZI recording. Accordingly, any improved article for use with rotating head digital data recorders should facilitate this so-called backward compatibility.

SUMMARY OF THE INVENTION

It is an object of the present invention to provide an improved article for a digital data bearing signal, particularly a magnetic article for recording such signals.

In accordance with the invention, an elongated magnetically coated member has a pair of spaced-apart, longitudinally extending, servo areas adapted to receive digital data signals laterally extending therebetween. One of the servo areas is spaced from one longitudinal edge of the tape for receiving identification or address signals relatable to the data signals recorded between the servo areas. Further, the servo areas extend longitudinally to an extent demarking beginning of tape toward the leader end of the article and end of tape, which denotes the spool end of the article.

Further, at the BOT end of the article, a space between the servo areas is reserved for density and format indicating signals for facilitating backward compatibility of recorders employing the improved article. One of the first data stripes adjacent the BOT end of the article includes the serial number of the article. Such serial number is also printed at the free end of the leader extending from the BOT area. A magnetically coated portion is reserved for recorder calibration; that is, whenever the article is loaded onto a rotating head magnetic recording apparatus, that apparatus will record signals in the test area and read such recorded signals back for calibrating the recording apparatus to the readback signals.

In a preferred constructed embodiment of the invention, the data stripe angle with respect to the longitudinal edge is about 17½°. The distance between two gaps of a magnetic head on a rotor adapted to be employed with the present article has an intergap distance slightly greater than the 17½° angled width of the servo areas. It is preferred that such recorder will employ the leading gap as a recording gap, but switch such gap between readback and recording circuits such that the recording gap can sense the servo track area signals simultaneous to the read gap, reading the identification signals adjacent the one longitudinal edge of the article. The action facilitates switching and stepping of the article. As the write gap leaves the tape immediately adjacent one of the servo signal areas, the read gap is still reading the data area; then, the tape can be simultaneously advanced to the next stripe. A preferred arrangement is such that the periodicity of the rotor and the transit time between two adjacent data signal receiving strips permits the write gap and the read gap to simultaneously read such one servo track area and said identification signals during that portion of the latency period required to step the article.

In accordance with another aspect of the invention, the gaps are switched in accordance with tachometer settings of the magnetic recorder for switching the write gap between recording and readback operations.

The foregoing and other objects, features, and advantages of the invention will become apparent from the following more particular description of the preferred embodiment, as illustrated in the accompanying drawing.

THE DRAWING

FIG. 1 is a diagrammatic showing of an improved article constructed in accordance with the present invention.

FIG. 2 is a diagrammatic showing of a pair of data signal receiving stripes, together with the servo signal areas and identification areas. Relationship of the geometry to intergap distance of a rotor is illustrated.

DETAILED DESCRIPTION

Figure 3:
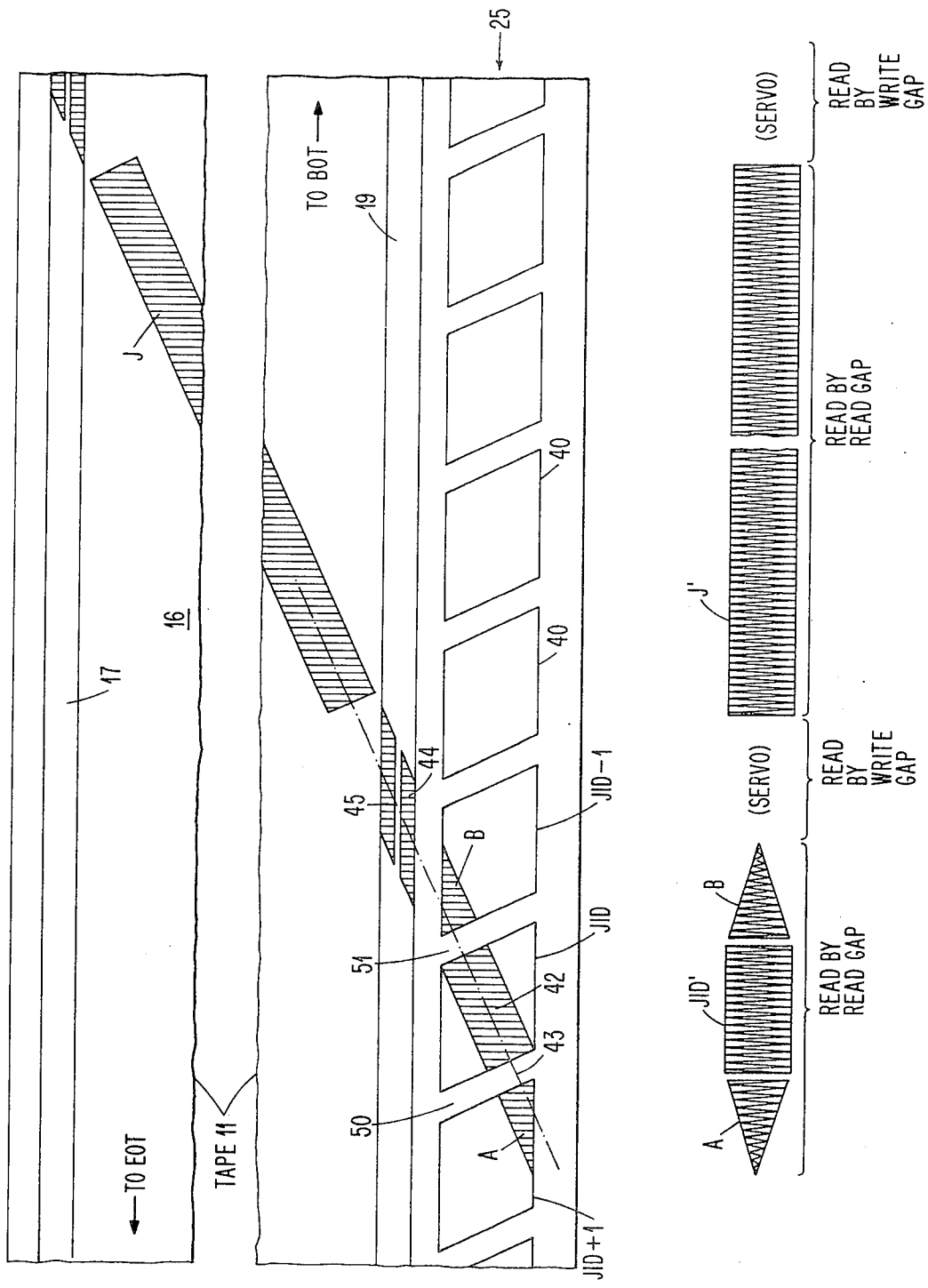
FIG. 3 is a greatly enlarged diagrammatic showing of the relationship of the servo track area, identification area, and a signal envelope derived from the improved article by a rotating magnetic transducer.

Referring to the drawing, like numerals indicate like parts and structural features in the various views and diagrams. The improved article of the present invention is advantageously mounted on a single flange spool 10. A cylindrical sleeve (not shown) fits on the spool to complete a dust-proof enclosure for the record article. The improved article includes elongated member 11 having a magnetic coating on one face thereof. The free end of member 11 is tapered at 12 for facilitating automatic threading. In the free-end portion, as at 13, a plurality of imprinted article serial numbers reside on the coated side of the article. The imprinted serial numbers are viewable through a covering transparent cylindrical sleeve (not shown). Such printing enables visual inspection and identification of various improved articles for facilitating handling and transfer. Such serial numbers facilitate logging performance statistics about each of the articles, as well as facilitating identification.

Immediately adjacent free end 12 is a leader area 14 which may or may not have magnetic coating thereon. Leader 14 facilitates automatic threading operations. Immediately adjacent area 14 is a magnetically coated test area 15 for enabling recording and readback of signals by each digital signal recorder employing the improved article. A test pattern of signals recorded in area 15 is sensed by the digital signal recorder. The amplitude, phase shift, and other characteristics of the readback signal are analyzed by recorder circuits which then automatically adjust the readback circuits for optimum readback of data signals recorded on the improved article. The details of such automatic readback circuits are not a part of the present invention.

The data recording area 16 of the improved article is completely defined and located by a pair of servo track areas 17 and 19. Each servo track area in a constructed embodiment of the improved article included areas for two parallel longitudinally extending servo tracks. The servo tracks contain signals identifying data stripe locations indicated by dashed lines 20 in FIG. 1 and by long narrow rectangles 21 and 22 in FIG. 2.

Each of the servo tracks in areas 17 and 19 may be constructed in accordance with U.S. Pat. No. 3,691,543, no limitation thereto intended. In the alternative, a single servo track may be employed in each of the areas 17 and 19.

The servo track areas 17 and 19 have precise longitudinal extents and locations. These areas demark all recording areas on the tape. The servo area ends adjacent free end 12 define beginning of tape, labeled "BOT," which signifies the area in which a rotating head can start recording data signals. In a similar manner, the spool ends of servo track areas 17 and 19 precisely denote end of the tape, labeled "BOT," which correspondingly defines the other longidutinal limit in which a recorder may record data signals.

In addition to data signal receiving area 16, which is left blank when the improved article is first manufactured, an identification and addressing track is located at 25 with a longitudinal extent substantially longitudinally coextensive with servo area 19. Identification and addressing area 25 will be described in detail later. In an early constructed embodiment of the present improved article, the identification area ended at 26 longitudinally toward spool 10 from free end 12. The first data record area number was 0 identifying a so-called "stripe 0." In this first constructed embodiment, stripe 0 had recorded therein the serial number of the improved article, which serial number correspond with the printed serial numbers at 13.

In practice, a digital signal recorder would receive the improved article and read stripe 0 to identify the particular article. In a preferred form of using the improved article, apparatus employing the article would identify which articles had never been used, i.e., "scratch" articles, and other articles which had previously received recording. For such "scratch" articles, stripe 0 is initially read, the article moved to stripe 1, with the serial number then recorded in stripe 1. Subsequent loading of such article into a digital signal recorder apparatus causes the apparatus to move to stripe 1 for reading the serial number. In this manner, possible erasure or other destruction of the serial numbers in stripe 0 is minimized. One procedure for effecting such protective reading is to always have the digital recorder step to stripe 1. If the stripe is erased, then stripe 0 is read. If the stripe 1 is in error, then additional stripes 2-9 may be employed for receiving such serial number. Additionally, other data may be recorded in stripes 1-9, such as usage indicators, error status, and other information usually found in header labels of one-half inch magnetic tape record media.

The longitudinal space extending from point 26 to BOT and disposed intermediate servo areas 17 and 19 is reversed for density and code indicating information. Such an area may accommodate up to 100 stripes, for example. When the first type of recording is employed, then all of such stripes in areas 26 to BOT are left blank. For a first modification, such as increased density, variation of stripe width, spacing, etc., a first particular code is inserted in the density area between space 26 and BOT, identifying the newer recording format. By such identification, backward compatability of the recorded improved article is identifiable.

In accordance with all of the above, the improved article, when shipped from a manufacturing plant, includes servo stripe areas 17 and 19 with their associated servo stripes, identification and addressing area 25, and the printed serial numbers at 13. Area 25 can have addresses 00000 to 13342 (decimal). The address signals consist of two eight-bit binary coded bytes which may be subjected to error correction codes or be redundantly recorded, as one pleases. All recording is inset from longitudinal edges 30 and 33 to provide a guard area of no recording.

Referring now more particularly to FIG. 2, the relationship of the improved article to a particular digital signal recorded with which the improved article can be advantageously employed is described. The timing relationship of the rotating head scanning of the tape with respect to the servo track areas and the identification and address stripe show the advantageous usage. As mentioned above, in a first constructed embodiment of the improved article, the angle of the data stripes, such as stripes 21 and 22, with respect to the longitudinal edges of the tape, is about 17½°. The data receiving areas 21 and 22 extend at such an angle between the precisely aligned servo areas 17 and 19. The lateral extent of the servo areas 17 and 19, as measured along the scan path 27 of a rotating head, is slightly less than the intergap distance between a write (W) and a read (R) gap of the single two-gap head on the rotor, as will be later described. This intergap distance, as at 28, being slightly greater than such transverse dimension of the servo areas, is advantageously employed when recording and stepping the improved article by a digital signal recorder. Assume that when gap W is scanning the tape at the lower edge 30, it is connected to a readback circuit. Gap W scans the address portion 25. The readback signals being identified as data signals are ignored. As gap W scans servo area 19, the readback signals are identified as servo signals and sent to a servo-mechanism used in connection with transporting article 11 past the rotating heads having gaps W and R. As gap W scans area 19, at 17½°, trailing gap R follows by distance 28 to simultaneously scan address area 25. The servo signals from gap W drive the servo-mechanism simultaneous with other readback circuits, analyzing the signals from area 25 to identify the location of the improved article with respect to gap W. After gap R has completed a scan of the appropriate portion of address area 25 signals, electronic circuits determine whether or not the article is appropriately positioned. If it is, then recording currents are turned on for recording data signals in stripe area 21, precisely aligned along the 17½° scan path with the appropriate portion of servo tracks in area 19, as well as the later-described address portion of area 25 associated with data signal receiving area 21. As gaps W and R continue to scan across tape 11, the signals are recorded through gap W into data signal receiving area 21. For checking the correctness of the recording in area 21, the recorded signals are simultaneously sensed by gap R as it scans area 21. Such read-after-write recording verification can follow the same procedures used in connection with prior digital data signal recorders; such as employed for ½ inch tapes.

As gap W leaves area 21, as at 31, all recording currents are removed from the gap. Gap R continues to sense the recorded signals. Gap W senses the area 17 servo signals to supply servo track signals to said servo-mechanism for use in connection with positioning the article, as is well known. Since the intergap distance 28 is slightly longer than the 17½° transverse dimension of area 17, gap W leaves area 17, as at 32, about substantially coincidentally with gap R leaving area 21, as at 31. At this time, gap R is substantially transversely inward of upper edge 33 of tape 11. The servo-mechanism is now actuated to step the article 11 to the next stripe, such as stripe 22. The constants of acceleration and the rotor velocity can be matched such that the stepping to stripe or signal receiving area 22 is the same time it takes for gap W to move from area 17 to just immediately prior to area 19 which is aligned with stripe 22. This transit time corresponds to the transverse dimension from area 17 to edge 33, plus the distance from edge 30 to lower edge 34 of area 19. This statement assumes a helical wrap of 360° of article 11 around a later-described mandrel, such that edges 30 and 33 abut. In this manner, for a single head type rotor, a minimum time is lost because of the rotor movement and tape movement for maximizing data signal throughput.

Referring next to FIG. 3, the detailed relationship of the address area 25 with respect to the data receiving area 16 is further explained. The address area 25 is recorded on the improved article in accordance with the Harr U.S. Pat. No. 3,366,897. Area 25 includes one address signal receiving area 40 corresponding to each data signal stripe or receiving area, such as areas 21 and 22 of FIG. 2. Areas 40 are precisely aligned along the 17½° scan path, with corresponding servo information signals in the servo areas 17 and 19. For example, assume that stripe J is to be accessed. It has an address area JID in area 25, which identifies the longitudinal address of stripe J. Read and write gaps R and W scan the hatched area 42 of address portion JID. The gap center line 43 identifies the scan path of both gaps. Stripe J, after recording by a suitable positioning based upon the servo tracks in area 19, corresponding to servo positioning indicating signals as at 44 and 45, is precisely aligned with JID center portion. In a similar manner, servo track area 17 has an additional pair of servo positioning signals corresponding to stripe J.

The signal envelope appearing from gap R in reading JID and stripe J is shown in the lower part of FIG. 3. Signal envelope portion A corresponds to gap R reading portion A of JID+1; i.e., only a portion of the gap R senses JID+1. The space between A and the signal JID' is the interaddress gap, as at 50. The JID' signal represents a full scan of the address area JID, enabling signal detection is accordance with known techniques. Following the JID' signal, gap 51 appears, followed by signal B from gap R sensing the B portion of address area JID-1. Then, the servo tracks are sensed (envelope now shown); following that, the data stripe J is sensed, as indicated by the signal J' followed by sensing the servo tracks from area 17, the signal envelope which is not shown.

It should be noted that the addressing and the data signals are read by gap R, while both servo tracks are read by gap W. Additionally, gap W records signals in the data stripe area, as well as selectively recording signals on the address portion, as will be later described. The preferred write gap to read gap ratio is about 2:1; i.e., the write gap scans a wider track than the read gap as commonly practiced in one-half inch tape recorders.

Figure 4:
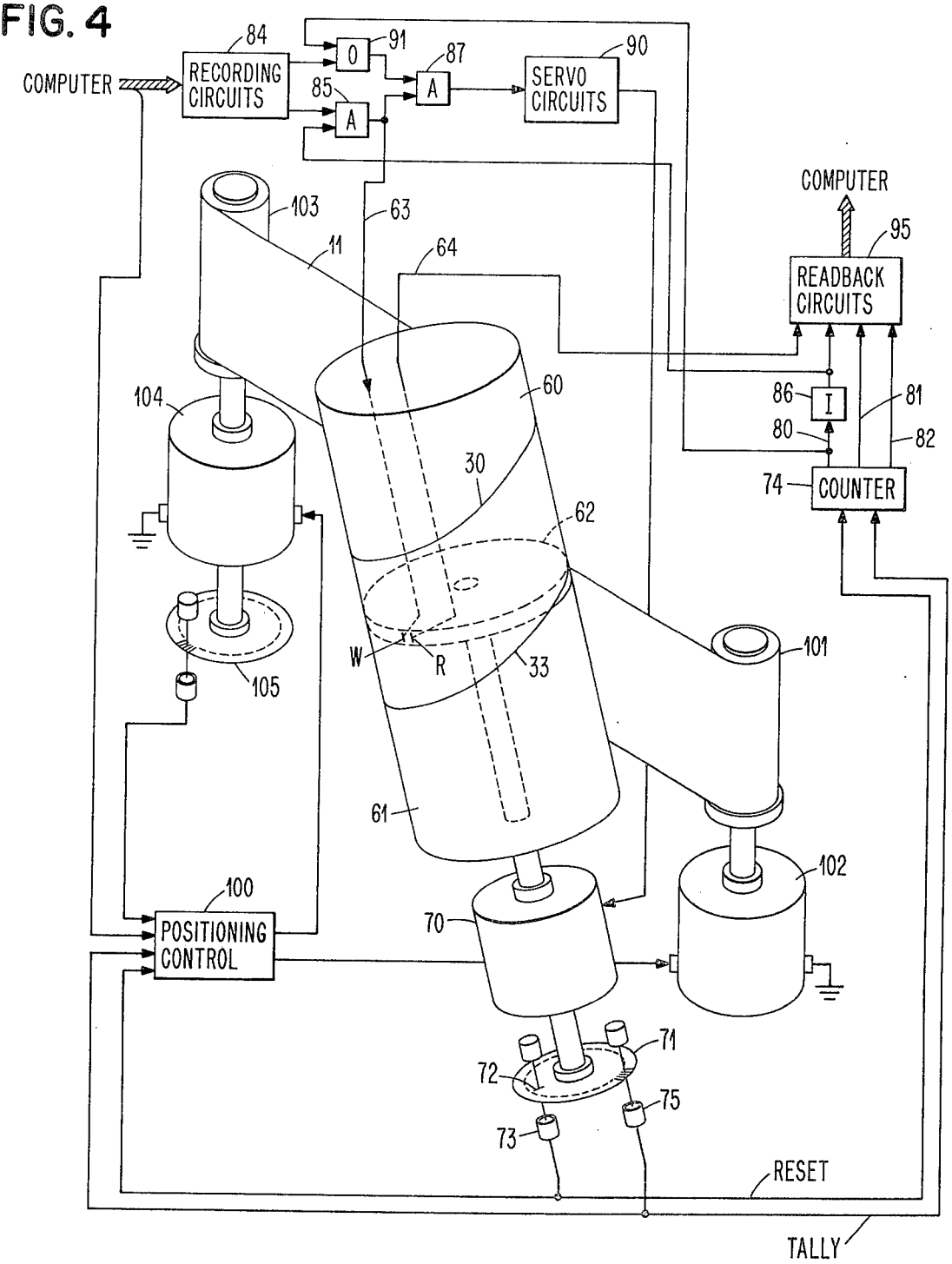
FIG. 4 is a diagrammatic showing of a rotating head recording apparatus adapted to utilize the present inventive article.

Referring next to FIG. 4, using the improved article in a rotating head digital signal recording apparatus is further described. The improved article 11 has a helical wrap around an air bearing mandrel consisting of two halves 60 and 61, the mandrel being stationary. Precisely coaxially aligned with the cylindrical mandrel 60, 61 is a single axially thin rotor 62 which carries gaps W and R, as above referred to. The intergap distance is the short distance between the gaps. A rotary transformer (not shown) of usual design is included in rotor 62 to provide electrical connections over lines 63 and 64, respectively, between gaps W and R and electronic circuits diagrammatically shown in FIG. 4.

Rotor 62 is driven at a constant angular velocity by motor 70. Motor 70 also includes a precisely constructed tachometer disk 71. Disk 71 has fiducial mark 72 precisely aligned with the angular position of gaps R and W such that sensor 73, supplying a signal indicative of sensing fiducial mark 72, provides a precise relationship of the angular location of gaps W and R for use in connection with the medium format shown in FIGS. 1 and 2. Sensor 73 supplies its fiducial signal to reset angular position counter 74 to a reference state, such as all 0's. In addition, sensor 75 senses the positional marks evenly distributed around the circumference of disk 71. Sensor 75 supplies corresponding angular position-indicating signals to counter 74 to tally same for indicating the present angular position of gaps R and W. For example, if the counter is set to all 1's by the reset, then the tally signals from sensor 75 decrement the counter toward zero as motor 70 rotates rotor 62 and tachometer disk 71. In the alternative, when counter 74 is set to all 0's, the tally signals from sensor 75 may increment the counter. Other reference states may be used in the counter in accordance with machine design principles.

The present count in counter 74, i.e., the indicating of the angular position of gaps R and W, passes head-switching positions represented by signals on the lines 80, 81, and 82. These positions correspond to the read and write gap positions, as shown in FIG. 2.

Since the apparatus is employed for recording digital data signals, a computer (not shown) is usually connected to the apparatus, no limitation thereto intended. The computer supplies the usual control signals for digital signal recorders and, in addition, supplies digital signals to be recorded. Recording circuits 84 receive the computer-supplied signals and convert them to a form suitable for recording on article 11. Such a form may be NRZI digital signals, as taught by Phelps in U.S. Pat. No. 2,774,646. Such NRZI recording, as taught by Phelps, is preferably encoded for reducing the charge effects in the rotary transformer. To this end, the record code taught by Patel in commonly assigned co-pending Patent Application Ser. No. 369,675, filed June 13, 1973, may be advantageously employed for recording signals in the data signal receiving area 16, as well as certain signals to be recorded in the address area 25. Such recording includes a preamble clock synchronizing set of signals, such as those employed in phase-encoded recording.

Signals to be recorded are supplied by recording circuits 84 through AND or coincidence circuit 85 for being supplied over line 63 to gap W. AND 85 passes such signals only when the gap W is scanning that portion or article 11 corresponding to the digital data signal receiving stripes in area 16. Counter 74 is constructed to decode the counts for defining data signal receiving area 16 by supplying a relatively low amplitude signal over line 80; i.e., the signal on 80 represents a series of tachometer counts from disk 71 corresponding to the scan portion represented by stripes 21, 22, etc. The signal on line 80 is supplied through inverting amplifier 86 to AND 85 for enabling the recording of signals by gap W. At all other times, coincidence circuit 85 is disabled, thereby protecting the integrity of the signals recorded at a manufacturing plant in servo areas 17 and 19 in accordance with the Harr patent, supra.

Gap W scans the servo areas 17 and 19, which have a predetermined relationship with the above-mentioned data receiving area, such that a second predetermined set of counts from disk 71, as manifested in counter 74, can be used to open AND circuit 87 to pass signals from line 63 to servo circuits 90. In this regard, whenever address area 25 is not to be updated, the signal on line 80 is passed through OR circuit 91 to enable AND 87 whenever AND 85 is disabled. Hence, in this manner, the signals on line 63 are passed to servo circuits 90 whenever the gap W is scanning a portion of the tape outside the data signal receiving area. Servo circuits 90 are constructed to ignore the data signal type of readback signals.

In addition, gap R supplies signals over line 64 to a set of readback circuits 95. Readback circuits 95 supply such readback signals to the computer whenever gap R is scanning signals in the data signal receiving area 16. This is indicated by the output of inverter 86. At other times, gap R is scanning area 25, which is indicated by the signal on line 81. In a similar manner, the signal on line 82 indicates gap R is scanning a non-data area of the tape. Similarly, the signal on line 82 disables readback circuits 95 whenever gap R is not scanning a signal receiving area on tape 11.

As additional controls and variations of modification of the signals are recorded on improved article 11, electronic circuits associated with a given digital signal recorder must necessarily become more complicated. In the preferred form of the invention, address area 25 has a set of addresses beginning at zero adjacent BOT extending through a predetermined number of stripes at EOT, for example 13,342, with the stripes being spaced center-to-center of about ten mils with a width of six mils, leaving an inter-address space of four mils. The data signal receiving stripes 21 and 22 can be made contiguous provided the recording signal apparatus has sufficiently accurate servo circuits and guiding apparatus (not shown) for precisely aligning each of the stripes as diagrammatically illustrated in FIGS. 1 and 2.

Since recording in data signal area 16 is initiated only after the article has been accurately positioned and such positioning verified, all data stripes 00000 to 13,342 are precisely aligned with the corresponding portions of the servo track areas 17, 19 and address signals at 25. Positioning control 100 coordinates medium 11 transport with rotor 62 position in a known manner. Supply or payout reel 101 driven by motor 102 and capstan-reel or takeup reel 103 via motor 104 are also coordinated in operation in accordance with Phillips U.S. Pat. No. 3,781,490. Tachometer 105 supplies position data signals to control 100. Translation of capstan reel 103 rotation to actual linear tape motion is calculated by the computer in accordance with tape wrap radius on capstan-reel 103. Threading medium 11 from reel 101 to reel 103 is in accordance with established automatic threading techniques.

It is anticipated that the illustrated record medium may be used by several different tape units as diagrammatically shown in FIG. 4. Such tape units usually will have different tape-guiding characteristics yielding slightly different record stripe angles—such angle differences are termed "skew." Such skew can result in readback errors, unintended recording overwritting resulting in obliteration of previous records. In spite of this skew problem, it is commercially imperative that record stripes be changeable without unintentionally obliterating any recorded signals. For achieving such a re-recording capability without error, record stripes 20 are grouped into record blocks such as 110 and 111, each such record block being separated by an area 112 containing no recorded signals. To re-record, one entire block 110 or 111 is recorded at a time. Following such a practice accommodates tape-guiding tolerances of various tape units.

Each record block may contain any number of record stripes 20; it is preferred that a fixed number of record stripes be selected, such as 50, 100, etc. Such a selection simplifies programming in computers using the illustrated record medium for data signal storage.

For maximizing data signal storage on each medium, area 112 (termed interblock gap or IBG) has a minimal length, for example, a length sufficient to accommodate one or two record stripes. Identification portion 25 can contain special indicia (all 1's, etc.) signifying an IBG, the computer recognizes IBG's by specified addresses, or the IBG can extend into portion 25.

It is preferred, for maximum flexibility, that each book and IBG be identified by decimal address such as set forth below for a 65-stripe block:

| Block Number | Block Addresses | IBG Addresses |
|---|---|---|
| 0 | 0–64 | 65 |
| 1 | 66–130 | 131 |
| 2 | 132–196 | 197 |
| 3 | 198–262 | 263 |
| 4 | 264–328 | 329 |
| 5 | 330–394 | 395 |
| — | — | — |
| — | — | — |
| N | 66N − (66 . N + 64) | 66N + 65 |

Each address consists of two bytes (address modulus of $2^{16}-1$) recorded in the ID portion 25 in accordance with the Patel et al co-pending application, supra, and Harr U.S. Pat. No. 3,666,897. The recorded signals appear in seriatim at the 17½° angle.

While the invention has been particularly shown and described with reference to a preferred embodiment thereof, it will be understood by those skilled in the art that various changes in form and detail may be made therein without departing from the spirit and scope of the invention.

What is claimed is:

1. For use with a magnetic tape, a rotating head tape recorder having a rotor for rotating in a first sense and with a recording head closely followed by a readback head for use with an elongate record medium having a leading longitudinal edge crossed first by said heads in close succession with one servo track spaced from said leading edge a distance corresponding to said close spacing of said heads with signals recorded on both sides of said servo track transversely to the elongation of the record medium, the improvement including in combination:
signal recording circuits;
servo circuits for exercising control over said recorder to position a tape in said recorder;
signal readback circuits electrically connected to said readback head for receiving signals therefrom;
a tachometer means connected to said rotor for indicating rotational position thereof; and
a double-throw, single-pole, electronic switch means responsive to said rotational position indication to switch said recording head between said servo circuits and said recording circuits such that said recording head alternately senses said servo track and records signals respectively as said readback head senses signals intermediate said leading edge and said servo track and then senses signals recorded by said recording head,
said tachometer means includes a resettable digital electronic counter generating signal content representing rotor position by a digital count and supplying signals indicative of position including means supplying signals indicating scan of said servo track adjacent said reference edge,
said electronic switch means consisting of first and second AND circuits having one common connection to said write head and respective individual connections to said signal recording circuits and said servo circuits and both said AND circuits receiving said servo track signals for alternately switching said write head between said servo circuits and said signal recording circuits, and
said signal readback circuits connected to said resettable digital electronic counter for selectively processing signals received from said readback head.

* * * * *